(12) United States Patent
Denys et al.

(10) Patent No.: US 7,810,839 B2
(45) Date of Patent: Oct. 12, 2010

(54) SIDE AIRBAG WITH AN ADAPTIVE VENTING DEVICE

(75) Inventors: Isabelle Denys, Valladolid (ES); Luis Jose Duarte De Arez, Valladolid (ES)

(73) Assignee: Dalphi Metal Espana S.A., Madrid (ES)

( * ) Notice: Subject to any disclaimer, the term of this patent is extended or adjusted under 35 U.S.C. 154(b) by 7 days.

(21) Appl. No.: 12/151,737

(22) Filed: May 8, 2008

(65) Prior Publication Data

US 2009/0091106 A1    Apr. 9, 2009

(30) Foreign Application Priority Data

May 9, 2007    (EP)    ................................. 07381037

(51) Int. Cl.
 *B60R 21/239*    (2006.01)
(52) U.S. Cl. .................. 280/739; 280/730.2; 280/743.2
(58) Field of Classification Search ............... 280/739, 280/730.2, 743.2
 See application file for complete search history.

(56) References Cited

U.S. PATENT DOCUMENTS

| 2004/0012180 A1* | 1/2004 | Hawthorn et al. ............ 280/739 |
| 2008/0042416 A1* | 2/2008 | Razazi et al. ............. 280/743.2 |
| 2009/0039630 A1* | 2/2009 | Schneider et al. ........... 280/740 |

* cited by examiner

*Primary Examiner*—Paul N. Dickson
*Assistant Examiner*—Barry Gooden, Jr.
(74) *Attorney, Agent, or Firm*—Ladas & Parry LLP

(57) ABSTRACT

The present invention relates to a side airbag for an automotive vehicle comprising a venting regulation device formed by a part made of a flexible material (21) joined to the inflatable cushion (11) such that it can completely or partially close or free the venting opening (17), and a tension belt (23) joined by one part to said part made of a flexible material (21) and by another part to the inflatable cushion (11), the geometric configurations of said tension belt (23) and said part made of a flexible material (21) being determined such that the degree of closing/freeing of the venting opening (17) varies according to the width of the inflatable cushion (11) during its different deployment phases during the collision, being closed in the initial and end phases and freed in the intermediate phase.

15 Claims, 2 Drawing Sheets

SIDE AIRBAG WITH AN ADAPTIVE VENTING DEVICE

FIELD OF THE INVENTION

The present invention relates to a venting device of a side airbag used in automobiles to dampen impacts experienced by drivers and passengers in the event of impacts or collisions, and more particularly to a venting device that can be adapted to impacts or collisions of different severities.

BACKGROUND OF THE INVENTION

A side airbag basically consists of a folded cushion that is quickly inflated by means of a gas produced by a generator when certain sensor devices detect a collision of the vehicle. The cushion is thus deployed between the vehicle's occupant and, usually, a door of the vehicle and protecting him/her during the collision.

In normal cushion deployment operation, the internal pressure produced by the generator when the cushion is filled with gas may be high enough to cause the cushion to be so hard that the occupant bounces off it. To prevent this drawback, they have been provided with a venting opening serving to reduce internal pressure of the cushion and, accordingly, the possibility of causing damage when they are activated.

The use of several means of blocking this venting opening to achieve a better control of the internal pressure in the cushion than that provided by only the variation of the size of the opening is in turn known. In this sense, the use of patches for achieving that the gas does not exit the discharge opening immediately but rather when the patch breaks as a given pressure inside the cushion has been reached, must be pointed out. The art has proposed different types of patches with different means for controlling the breaking thereof, more or less according to a certain resistance to the gas pressure inside the cushion. The presence of the gas pressure required for the cushion to carry out its protective function is thus made compatible with the assurance that the gas pressure will not reach an excessive value, with the risk for the people for whom the cushion is deployed.

Additionally, venting devices that allow increasing the gas outlet flow according to the specific characteristics of each collision and the type of passenger involved have also become necessary, and to that effect several venting device solutions providing surface adjustable venting openings facilitating the increase of the venting area as the internal pressure in the cushion increases are also known.

A newly arisen need involves the need for airbags that allow reducing the venting area, even completely eliminating it, in certain impact conditions, which requires closing mechanisms that must function in the sense opposite to the art known up until now. The traditional previously mentioned patches had to completely seal the outlet opening until the internal gas pressure inside the cushion did not reach a given level and then they broke, no longer functioning; now the opposite is required: devices that allow closing the venting opening in certain situations. Some proposals to that effect are known, such as the following.

Spanish patent ES 2,182,629, U.S. Pat. No. 6,139,048, US patent application 2004/0090054, patent application WO 2006/024472 and US patent application 2006/0151979 describe devices using moving elements to close the venting opening using the stresses produced in the cushion due to the pressure difference together with the difference of how the occupant strikes the airbag.

Patent applications EP 1,640,221 and WO 2007/003418 describe passive venting control mechanisms using elements which close the venting opening when certain conditions arise.

The present invention proposes a side airbag with an adaptive venting device with functionalities different from those of the mentioned art.

SUMMARY OF THE INVENTION

An objective of the present invention is to provide a side airbag with a venting that can be adjusted to different conditions of severity of the impact or collision. It aims to take into consideration the different configurations of the impact and the evolutions provided therein (increase of the impact velocity, barrier change, . . . ) contemplated by the administrative regulations and/or regulations demanded by the consumers.

Another objective of the present invention is to provide a side airbag without gas losses—or with little gas losses—in the initial deployment phase.

Another objective of the present invention is to provide a side airbag which allows controlling the stress applied on the occupant's side, i.e. the chest, abdomen or pelvis as required. Controlling the stress allows preventing injuries to the occupant.

These and other objectives are achieved by means of a side airbag comprising an inflatable cushion including at least one venting opening and being configured to be deployed between a vehicle occupant and the vehicle body, and incorporating a venting regulation device formed by a part made of a flexible material joined to the inflatable cushion such that it can completely or partially close or free said venting opening, and a tension belt joined by one part to said part made of flexible material and by another part to the inflatable cushion, the geometric configurations of said tension belt and said part made of flexible material being determined such that the degree of closing/freeing the venting opening varies according to the width of the inflatable cushion during the different phases of its deployment during the collision, being closed in the initial and end phases and freed in the intermediate phase when the inflatable cushion reaches its maximum width when it enters into contact with the vehicle occupant.

Some relevant advantages of said venting regulation device include the following:

It can be easily integrated in the inflatable cushion.
It is passive and therefore requires no electrical signal to be activated.
It is low-cost.
Its operation regulating parameters can be easily changed.

Other features and advantages of the present invention will become evident from the following detailed description of several illustrative and by no means limiting embodiments of its object in relation to the attached drawings.

DETAILED DESCRIPTION OF THE INVENTION

Figure 1A:
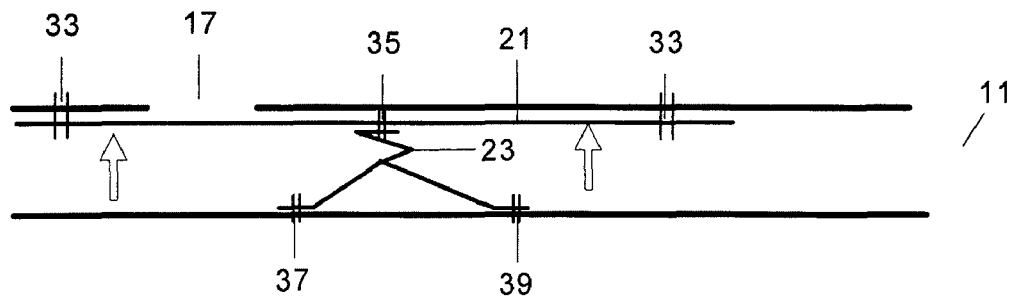
FIGS. 1a, 1b and 1c schematically show the operation of a side airbag with a venting regulation device according to the present invention formed by a part made of a flexible material and a tension belt.

The object of the present invention is a side airbag which does not allow venting in its initial and end deployment phases and which regulates venting during the intermediate deployment phase in a manner adapted to the nature of the impact. A side airbag with these functional features meets the objectives mentioned above.

The side airbag according to the present invention includes an inflatable cushion 11 with a venting opening 17 and a venting regulation device formed by a part made of a flexible material 21 and a tension belt 23 the features of which will be explained below according to FIGS. 1a, 1b and 1c in which the inflatable cushion 11 can be seen schematically in three moments of the initial phase, the intermediate phase and the end phase of its deployment.

The part made of a flexible material 21 is joined by its perimeter, completely or partially to the inflatable cushion 11 by means of suitable joining means 33 such as seams for example, without being tensed, but rather leaving a clearance between it and the cushion. The venting opening 17 is located inside the perimeter of the part made of a flexible material 21.

Figure 1B:
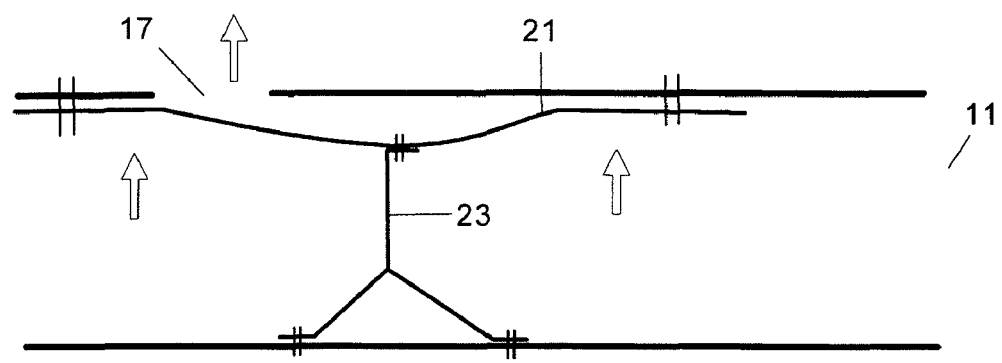
Figure 1C:
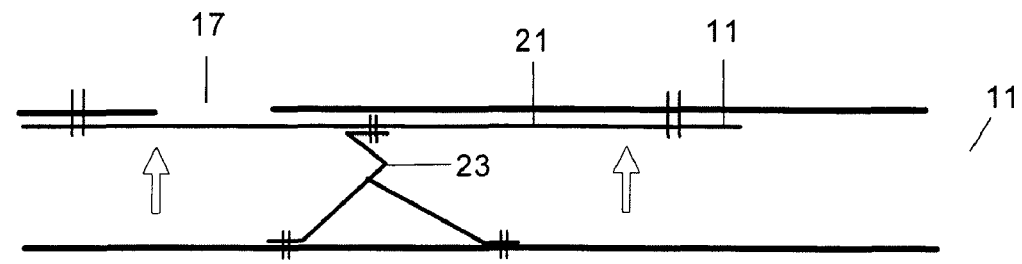

The tension belt 23, which is usually in band shape, is joined by one part to the part made of a flexible material 21 by means of suitable joining means such as seams 35, and by another part to the inflatable cushion 11 by means of suitable means such as seams 37, 39, at two points thereof in the case shown in FIGS. 1a, 1b and 1c.

According to the invention, the geometric configuration of said part made of a flexible material 21 and said tension belt 23 are provided so that the deployment of the inflatable cushion during a collision occurs in the three phases described below.

In the initial deployment phase shown in FIG. 1, the venting opening 17 is completely closed by the part made of a flexible material 21, preventing gas losses through the venting opening 17.

The suitable operation of the venting regulation device may require the use of means in addition to the joining means 33 of the part made of a flexible material 21 to the inflatable cushion 11.

Figure 3:
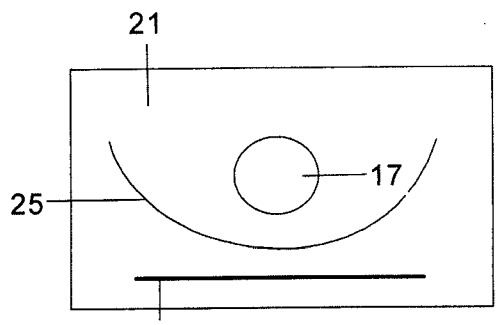
FIGS. 3 and 4 schematically show two embodiments of the device allowing the part made of a flexible material to completely close the venting opening in the initial cushion deployment phase.

An additional suitable mean shown in FIG. 3 consists of an additional seam 25 of the part made of a flexible material 21 to the inflatable cushion which can be broken when the tension belt 23 applies certain tension on the part made of a flexible material 21.

Figure 4:
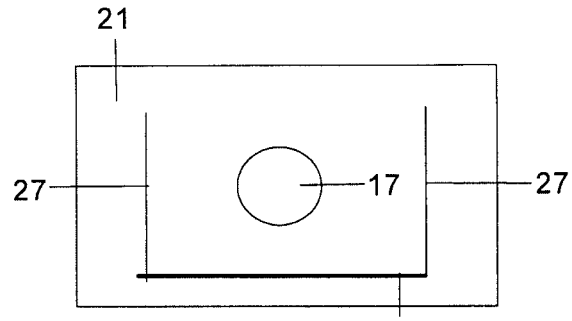

Another additional suitable mean particularly when the part made of a flexible material 21 is joined to the inflatable cushion 11 along its entire perimeter preventing any gas leak consists of, according to FIG. 4, pre-cuts 27 defining breaking lines when the tension belt 23 applies a certain tension on the part made of a flexible material 21.

In the intermediate deployment phase of the inflatable cushion 11 shown in FIG. 1b, and as a result of the progressive entrance of gas increasing the width of the cushion, the tension belt 23 pulls on the part made of a flexible material 21 making it depart from the opening and, as the case may be, breaking the breakable seam 25 or opening the breaking lines defined by the pre-cuts 27. Since the tension belt 23 and the part made of a flexible material 21 are tensed, the venting opening 17 does not close.

In the end phase shown in FIG. 1c, when the inflatable cushion 11 is struck, when it enters into contact with the occupant its width reduces, determining that the tension belt 23 and the part made of a flexible material 21 lose tension, causing the part made of a flexible material 21 to gradually move towards the venting opening 17 until completely closing it.

Figure 2A:
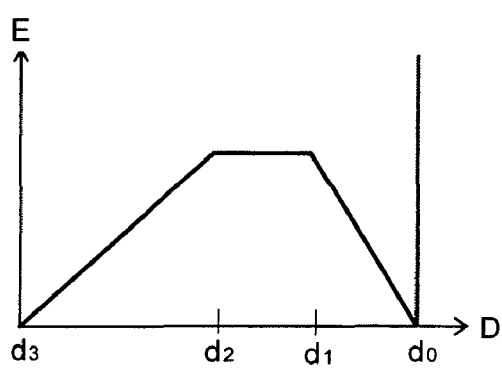
FIGS. 2a and 2b schematically show the effect of the venting regulation device according to the present invention in a stress-movement diagram.
Figure 2B:
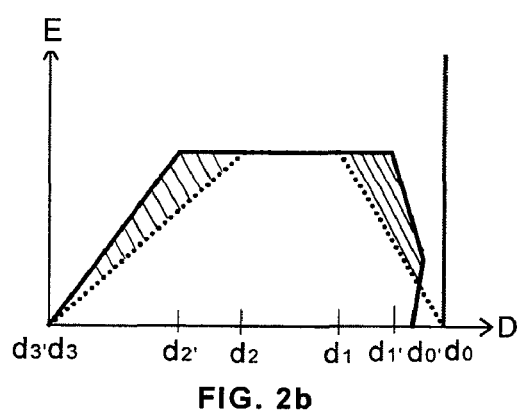

The improvement of the adaptiveness of the side airbag according to the invention is illustrated in FIGS. 2b and 2a, respectively showing stress (S)/movement (M) graphs of a side airbag with and without a venting regulation device according to the present invention, where S is the stress applied by the airbag cushion on the occupant and M the occupant's position in relation to the vehicle door.

FIG. 2a shows three sections in the graph as a result of the evolution of the pressure in the cushion: in the first section between movement m3, when the airbag cushion enters into contact with the occupant, and movement m2, stress S constantly increases, in a second section between movement m2 and movement m1, stress S is constant, and in the end section between movement m2 and movement d0 in which the occupant would come into contact with the vehicle door, the stress constantly decreases.

FIG. 2b includes together with the graphic of the side airbag according to the present invention, the graphic of FIG. 2a using dotted lines and areas with lines between them to facilitate the comparison, the following differences can be observed in relation to FIG. 2a:

The first section, between movement m3' and movement m2' is shorter since the pressure increases quickly since the venting opening is closed.

The start of the second section in movement m2' moves ahead, the opening of the venting opening beginning, which allows controlling the stress applied on the side of the occupant, i.e. the chest, abdomen or pelvis, as needed, preventing injuries to the occupant.

In the third section the venting opening is closed, thereby keeping gas in the airbag cushion preventing contact between the occupant and the vehicle door. Its start is therefore delayed to movement m1' and its end is moved ahead to movement m0'.

Figure 5A:
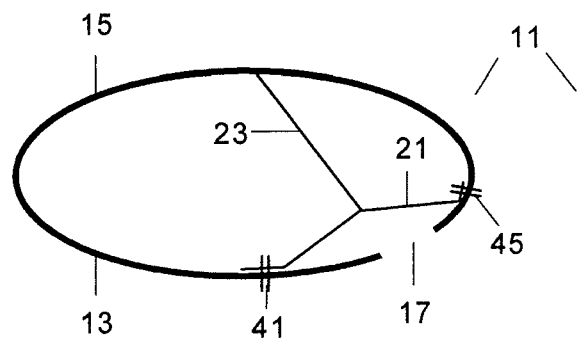
FIGS. 5a and 5b schematically show a first embodiment of the present invention.
Figure 5B:
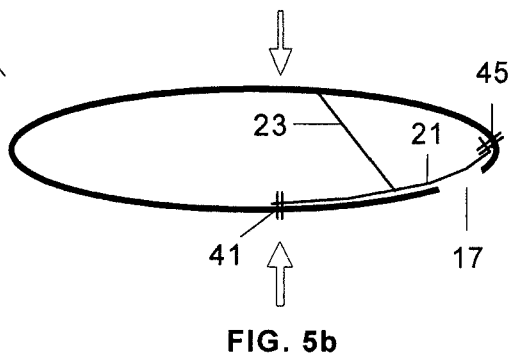

In the embodiment shown in FIGS. 5a and 5b, the inflatable cushion 11 is formed by two panels 13, 15, the part made of a flexible material 21 is joined to the panel 13 of the cushion 11 by means of joining means 41, 45 and the tension belt 23 is joined to the other panel 15. FIG. 5a shows the cushion 11 in its state of maximum width with the opening 17 open since the tension belt 23 is tensed and FIG. 5b does so in a state of less width after receiving the occupant's strike, in which the orifice 17 is closed by the part made of a flexible material 21 when the tension belt 23 loses tension.

Figure 6A:
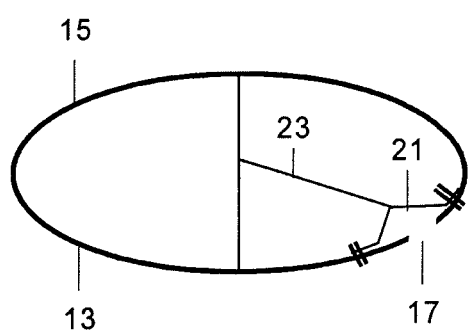
FIGS. 6a and 6b schematically show a second embodiment of the present invention.
Figure 6B:
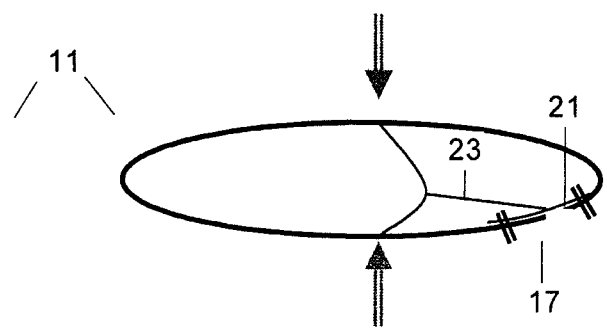

FIGS. 6a and 6b show another embodiment of the invention in which the tension belt 23 has three arms and the part made of a flexible material 21 has a relatively small dimension.

Figure 7A:
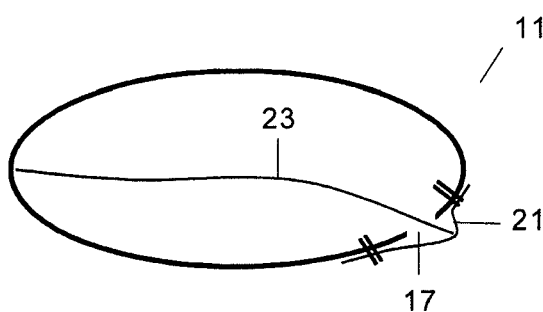
FIGS. 7a and 7b schematically show a third embodiment of the present invention.
Figure 7B:
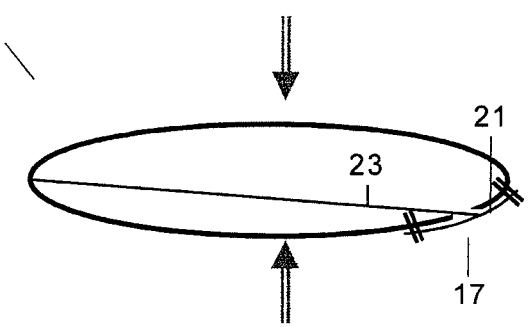

Finally, FIGS. 7a and 7b show another embodiment of the invention in which the part made of a flexible material 21 is joined to the inflatable cushion 11 by its outer part. In this case, FIG. 7a shows the cushion 11 in its state of maximum width with the opening 17 open and with the belt 23 without tension since the part made of a flexible material 21 is located on the outside of the cushion 11, and FIG. 7b shows the cushion 11 with a reduced width after receiving the load of the occupant and with the belt 23 tensed to close the opening 17.

Although several embodiments of the invention have been described and shown, modifications comprised within the scope thereof can be introduced, the scope not being limited to said embodiment but to the content of the following claims.

The invention claimed is:

1. A side airbag for an automotive vehicle comprising:
   an inflatable cushion (11) that can be inflated with the gas produced by a generator when a collision occurs, including at least one venting opening (17) and being configured to be deployed between a vehicle occupant and the vehicle body,
   a venting regulation device formed by a part made of a flexible material (21) joined to the inflatable cushion (11) such that it can completely or partially close or free said venting opening (17), preventing or allowing the outlet of gas, and
   a tension belt (23) joined by one part to said part made of a flexible material (21) and by another part to the inflatable cushion (11), the geometric configurations of said tension belt (23) and said part made of a flexible material (21) being determined such that the degree of closing/freeing of the venting opening (17) varies according to the width of the inflatable cushion (11) during different deployment phases during the collision, the venting opening (17) being closed in the initial and end phases and freed in the intermediate phase in which the inflatable cushion (11) reaches its maximum width when entering into contact with the vehicle occupant,
   wherein the part made of a flexible material (21) is initially joined to the inflatable cushion (11) such that it completely closes the venting opening (17), and includes means (25, 27) for allowing the formation therein of a breaking line when tension is applied thereof by means of the tension belt (23).

2. A side airbag for an automotive vehicle according to claim 1, wherein the part made of a flexible material (21) is joined to the inflatable cushion (11) outside the inflatable cushion (11).

3. A side airbag for an automotive vehicle according to claim 1, wherein the inflatable cushion (11) is formed by two panels (13, 15) and the tension belt (23) is joined to the part made of a flexible material (21) and to the two panels (13, 15) of the inflatable cushion (11).

4. A side airbag for an automotive vehicle according to claim 3, wherein the part made of a flexible material (21) is joined only to one of the panels (13) of the inflatable cushion (11).

5. A side airbag for an automotive vehicle according to claim 1 wherein the inflatable cushion (11) is formed by two panels (13, 15) and the tension belt (23) is joined to the part made of a flexible material (21) and to the two panels (13, 15) of the inflatable cushion (11).

6. A side airbag for an automotive vehicle according to claim 5, wherein the part made of a flexible material (21) is joined only to one of the panels (13) of the inflatable cushion (11).

7. A side airbag for an automotive vehicle according to claim 1, wherein the part made of a flexible material (21) is joined to the inflatable cushion (11) inside the inflatable cushion (11).

8. A side airbag for an automotive vehicle according to 7, wherein the inflatable cushion (11) is formed by two panels (13, 15) and the tension belt (23) is joined to the part made of a flexible material (21) and to the two panels (13, 15) of the inflatable cushion (11).

9. A side airbag for an automotive vehicle according to claim 8, wherein the part made of a flexible material (21) is joined only to one of the panels (13) of the inflatable cushion (11).

10. A side airbag for an automotive vehicle according to claim 1, wherein said means consist of a breakable seam (25) in the part made of a flexible material (21).

11. A side airbag for an automotive vehicle according to 10, wherein the inflatable cushion (11) is formed by two panels (13, 15) and the tension belt (23) is joined to the part made of a flexible material (21) and to the two panels (13, 15) of the inflatable cushion (11).

12. A side airbag for an automotive vehicle according to claim 11, wherein the part made of a flexible material (21) is joined only to one of the panels (13) of the inflatable cushion (11).

13. A side airbag for an automotive vehicle according to claim 1, wherein said means consist of pre-cuts (27) in the part made of a flexible material (21).

14. A side airbag for an automotive vehicle according to 13, wherein the inflatable cushion (11) is formed by two panels (13, 15) and the tension belt (23) is joined to the part made of a flexible material (21) and to the two panels (13, 15) of the inflatable cushion (11).

15. A side airbag for an automotive vehicle according to claim 14, wherein the part made of a flexible material (21) is joined only to one of the panels (13) of the inflatable cushion (11).

* * * * *